Aug. 27, 1946.    R. R. GUNDERSON    2,406,328
POWER BRAKE MECHANISM
Filed Sept. 27, 1943
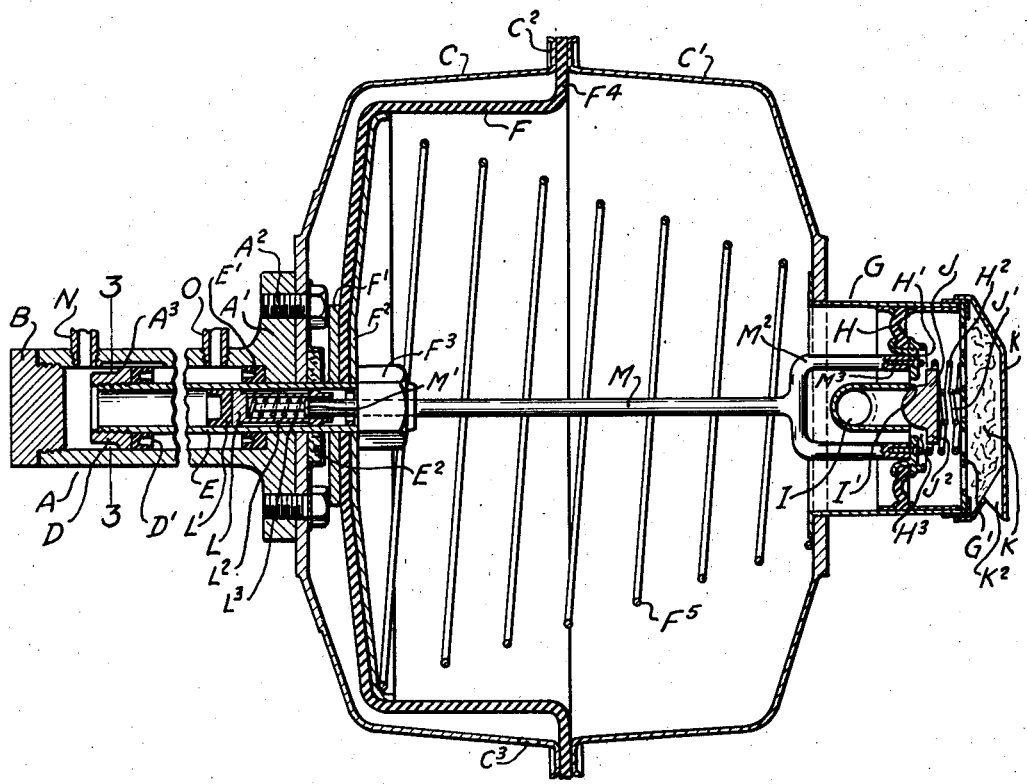
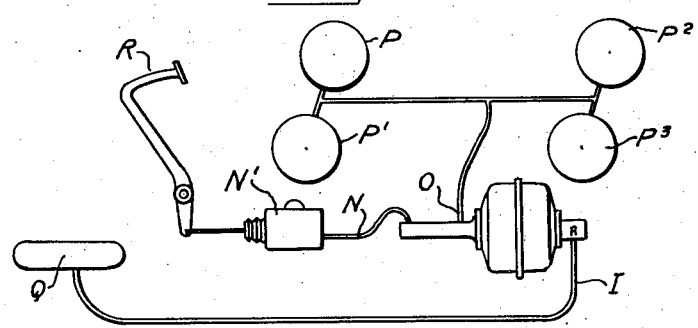
INVENTOR.
Ralph R. Gunderson
BY
Whittemore Hulbert & Belknap
ATTORNEYS Patented Aug. 27, 1946

2,406,328

UNITED STATES PATENT OFFICE 2,406,328

POWER BRAKE MECHANISM

Ralph R. Gunderson, Chicago, Ill.

Application September 27, 1943, Serial No. 503,975

4 Claims. (Cl. 60—54.5)

The invention relates to power brake mechanisms of that type in which the power applied by the pressure of the brake pedal is augmented by a booster motor. More particularly the construction is of the type in which the booster motor is actuated by suction from the engine which is controlled by the operation of the pedal.

One of the objects of the invention is to obtain a construction in which a single self contained unit may be installed in connection with any ordinary hydraulic brake operating mechanism to provide for power operation thereof.

A further object is to obtain a construction which can be conveniently located anywhere on the vehicle.

Another object of the invention is to obtain a construction in which increase in booster power is dependent upon proportional increase in pedal pressure thereby rendering the system more delicately responsive to the operator's control.

Still further it is an object to obtain a simple construction having a minimum number of parts and dispensing with the necessity for employing brackets and levers in its installation.

It is also an object to provide a restricted by-pass for the direct passage of fluid from the master cylinder to the wheel cylinders whereby the brakes may be initially operated without the assistance of the booster motor and any air in the system may be eliminated.

With these and other objects in view the invention consists in the construction as hereinafter set forth.

In the drawing:

Fig. 1 is a central longitudinal section through my improved unit;

Fig. 2 is a diagram illustrating its installation in connection with an ordinary hydraulic brake system;

Fig. 3 is a cross section on line 3—3, Fig. 1.

As illustrated, A is a cylinder provided at one end with a closure cap B and at its opposite end with a head A' on which latter is mounted a casing secured by bolts $A^2$. This casing is preferably formed of two sections C and C' centrally connected to each other by peripheral flanges $C^2$. Within the cylinder A is a piston D having a cup-shaped packing D' and which is mounted on a tubular rod E extending through the head A' into the casing C. F is a cup-shaped flexible diaphragm connected to the rod E by a stop plate F' on one side thereof and a pressure plate $F^2$ on the opposite side. A nut $F^3$ engaging a threaded end portion of the rod E forms the means for clamping these plates and diaphragm together. The diaphragm F is also provided with a peripheral flange $F^4$ which extends between the flanges $C^2$ of the casing sections C, C' and is secured thereto.

The casing section C' has mounted thereon a housing G of smaller dimensions containing a flexible diaphragm H. Adjacent to this diaphragm and arranged centrally thereof is a suction conduit I terminating in an annular seat I'. A valve member J normally engages this seat, being resiliently pressed thereagainst by a spring J'. An annular flange $J^2$ on the member J forms a seat for an annular fitting H' on the diaphragm H, said fitting being normally retracted from said seat by the pressure of a spring $H^2$ so as to leave an open annular port $H^3$ between the same and the member J. The springs J' and $H^2$ abut against a perforated diaphragm G' in the housing G and on the other side of this diaphragm is arranged filtering or air cleaning material K, retained by a cap member K'. An opening $K^2$ in this cap provides access for air which passes through the filtering material into the housing G and casing C, C' maintaining atmospheric pressure in the latter.

The tubular piston rod E forms a cylinder for a small piston L slidable therein and having a cup-shaped seal L'. A tubular shank $L^2$ for this piston contains the helical spring $L^3$ which surrounds a rod M and engages a shoulder M' thereon. The rod M extends through the casing C, C' and has at its outer end a bifurcated portion $M^2$ which embraces the suction conduit I, and is secured by screws $M^3$ to the annular fitting H'. The arrangement is such that an outward movement of the piston L will through the spring $L^3$ and rod M communicate its motion to the diaphragm H and press the annular fitting H' against the flange $J^2$ of the member J to close the annular port $H^3$. A further movement in the same direction will disengage the member J from the seat I' so as to open communication between the suction conduit I and the interior of the housing G and casing C'.

The unit as just described may be mounted in any convenient location on the vehicle and is connected into the hydraulic brake system thereof as follows:

A conduit N leading from a master cylinder N' of any suitable construction connects with the cylinder A at the left end thereof as shown in Figure 1. A conduit O connected to the right-hand end of the cylinder leads to the wheel cylinders diagrammatically illustrated at P, P', $P^2$, $P^3$, Figure 2. The suction conduit I is connected to the inlet manifold Q of the engine or other source of suction. R is the brake pedal for operating a master cylinder N'.

When the unit is first installed the cylinder A and its connections are filled with hydraulic fluid by the operation of the pedal R and master cylinder N'. By-pass grooves $A^3$ in the cylinder A extend on opposite sides of the piston D in its normal position so as to permit the passage of fluid therethrough and also the escape of air. The air in the cylinder A and the conduit O will also be permitted to escape through the usual bleed connections that are provided for each of the wheel cylinders. After the system is completely filled with fluid the operation is as follows:

Pressure on the brake pedal R will force fluid from the master cylinder N' into the cylinder A to the left of the piston D. The fluid will also pass through the tubular rod E and displace the piston L therein, thereby compressing the spring $L^3$ and moving the rod M, this through its bifurcated connection $M^2$ will move the diaphragm H until the annular fitting H' bears against the annular flange $J^2$ and closes the air inlet port $H^3$. The member J is then moved away from the seat I' which, by establishing communication between the suction conduit I and the interior of the casing C', will lower the pressure in the latter. This will permit atmospheric pressure on the outside of the cup-shaped diaphragm F, having access thereto through ports $C^3$ in the casing C, to move said diaphragm to the right carrying with it the tubular rod E and piston D. The fluid thus displaced by the piston D passes through the conduit O to the several brake cylinders. When the pressure within the casing C' and communicating housing G is lowered, atmospheric pressure on the right-hand side of the diaphragm H will urge the diaphragm and rod M to the left, compressing the spring $L^3$ and shutting off the suction at I', so that increased pedal pressure is required to reopen the suction line at I'. Thus, the total effect is to produce a reaction against the brake pedal which requires the operator to increase pressure thereagainst in proportion to the effect of atmospheric pressure on the diaphragm H. Furthermore, when the piston D moves to the right within the cylinder A, it enlarges the chamber to the left so that more fluid must be supplied from the master cylinder to fill this space.

If movement of the pedal is stopped, atmospheric pressure on the diaphragm H will compress the spring $L^3$ and shut off the suction line, and if the piston D is moving to the right under the influence of the booster, pressure will be reduced on the small piston L and will further facilitate the closing movement of the valve.

Whenever pressure on the brake pedal is relieved the combined force of atmospheric pressure on the diaphragm H and tension of the spring $L^3$ will move the piston L and rod M to the left, first permitting the valve J to engage the seat I' to cut off the suction and then opening the annular port $H^3$ to restore the pressure within the casing to atmospheric pressure. A spring $F^5$ within the casing C' abutting thereagainst at one end and at its opposite end against the pressure plate $F^2$, restores the diaphragm F to its normal position. The sliding joint between the rod E and head A' is sealed by a cup-shaped packing E' in the cylinder A, while a felt packing $E^2$ is arranged around the rod outside of the cylinder.

By reason of the restricted by-pass grooves $A^3$ the initial operation bringing the braking surfaces in contact is effected by fluid passing directly from the master cylinder to the wheel cylinders and without the assistance of the booster motor. Also as these grooves are in the upper portion of the piston the entrapping of air behind the same is avoided.

As previously stated, the construction of the unit is very simple and its installation only requires connection to the conduits N, O and I.

What I claim as my invention is:

1. In a hydraulic brake system, a power unit comprising a main cylinder adapted to be connected at one end to a pedal-actuated master cylinder and at its opposite end to a wheel cylinder, a power piston dividing said main cylinder into a master cylinder side and a wheel cylinder side, a booster motor mounted on one end of the main cylinder, said booster motor having a movable wall therein, a tubular piston rod connecting said power piston with said movable wall, said tubular piston rod forming a movable cylinder communicating with the master cylinder side of said power piston, a valve for controlling said booster motor, and a small piston within said movable cylinder operatively connected to said valve, said small piston being actuated by fluid pressure on the master cylinder side of the power piston and the effective area of the master cylinder side of said power piston being reduced by the area of said small piston in all positions.

2. In a hydraulic brake system, a power unit comprising a main cylinder adapted to be connected at one end to a pedal actuated master cylinder and at its opposite end to a wheel cylinder, an enlarged casing mounted on one end of said main cylinder, a flexible diaphragm forming a portion of a wall of a chamber within said casing, a power piston dividing said main cylinder into a master cylinder side and a wheel cylinder side, a tubular piston rod connecting said power piston with said flexible diaphragm, said tubular piston rod forming a movable cylinder communicating with the master cylinder side of said power piston, valve means for relatively connecting said chamber with a source of suction or with an atmospheric pressure, and a small piston within said movable cylinder for actuating said valve means, said small piston being actuated by fluid pressure on the master cylinder side of the power piston and the effective area of the master cylinder side of said power piston being reduced by the area of said small piston in all positions.

3. In a hydraulic brake system, a power unit comprising a cylinder adapted to be connected at one end to a pedal actuated master cylinder and at its opposite end to a wheel cylinder, an enlarged casing mounted on said first mentioned cylinder, a flexible diaphragm forming a portion of a wall of a chamber within said casing, a piston within said first mentioned cylinder, a tubular rod on which said piston is mounted communicating with the master cylinder end of the first mentioned cylinder and connected to said flexible diaphragm, a small piston slidable within said tubular rod, a small area diaphragm forming a portion of the opposite wall of said chamber, valve means controlling the alternative connection of said chamber with a source of suction and with the external atmosphere, said valve means being normally held in position to close said suction connection and open the atmospheric connection, and a rod actuated by said small piston for moving said valve means into its suction supplying position and thereby actuating said first mentioned piston by said large flexible diaphragm, such movement of the valve means being opposed by said small area diaphragm in proportion to the suction within said chamber.

4. In a hydraulic brake system, a power unit comprising a cylinder adapted to be connected at one end to a pedal actuated master cylinder and at its opposite end to a wheel cylinder, said first-mentioned cylinder having an enlarged casing mounted on one end thereof, a flexible diaphragm forming a portion of the wall of a chamber within said casing, a piston within said first mentioned cylinder, a tubular rod on which said piston is mounted passing out from said cylinder and connected to said flexible diaphragm, a small piston slidable within said tubular rod, a small area diaphragm forming a portion of the opposite wall of said chamber and carrying a ported member through which communication is established between said chamber and the external atmosphere, a suction conduit extending into said chamber having a valve seat surrounding an open end thereof arranged in alignment with the port in said ported member, a valve normally engaging said seat extending through said port and providing an external seat for said ported member normally spaced therefrom, resilient means for yieldably holding said valve and said ported member in normal positions, and a rod in the path of said small piston connected with said ported member whereby increased hydraulic pressure on the master cylinder side of said piston will actuate said small piston and through the latter and connecting rod will actuate said ported member to close said atmospheric connection and open said suction conduit thereby actuating said piston by said large flexible diaphragm and opposing movement of said valve by said small flexible diaphragm.

RALPH R. GUNDERSON.